United States Patent [19]

Tsuneki

[11] Patent Number: 4,660,998
[45] Date of Patent: Apr. 28, 1987

[54] DOT-MATRIX PRINTER WITH FONT CARTRIDGE UNIT

[75] Inventor: Yukio Tsuneki, Hanno, Japan

[73] Assignee: Kabushiki Kaisha Toshiba, Kawasaki, Japan

[21] Appl. No.: 770,994

[22] Filed: Aug. 30, 1985

[30] Foreign Application Priority Data

Aug. 31, 1984 [JP] Japan .................... 59-181872

[51] Int. Cl.$^4$ ............................................ B41J 5/48
[52] U.S. Cl. .................................... 400/61; 400/70;
400/121; 400/692; 364/519; 365/63
[58] Field of Search .................. 400/61, 62, 70, 692,
400/121, 124; 365/63, 105; 235/419; 307/154;
339/17 LC, 17 M, 17 CF; 364/519

[56] References Cited

U.S. PATENT DOCUMENTS

| 4,159,541 | 6/1979 | Ward | 365/63 X |
| 4,388,010 | 6/1983 | Mott | 400/121 X |
| 4,400,791 | 8/1983 | Kitado | 364/900 |
| 4,452,136 | 6/1984 | Boynton | 400/124 X |
| 4,458,333 | 7/1984 | Smith | 400/121 X |

FOREIGN PATENT DOCUMENTS

| 0040313 | 11/1981 | European Pat. Off. | 400/124 |
| 2924178 | 1/1980 | Fed. Rep. of Germany | 400/124 |
| 3128360 | 2/1983 | Fed. Rep. of Germany | 400/76 |
| 59469 | 4/1984 | Japan | 400/692 |
| 115869 | 7/1984 | Japan | 400/692 |

Primary Examiner—Paul T. Sewell
Attorney, Agent, or Firm—Finnegan, Henderson, Farabow, Garrett and Dunner

[57] ABSTRACT

A dot-matrix printer of the invention uses a font cartridge unit storing in advance character pattern data corresponding to characters other than standard characters. The font cartridge unit comprises a ROM or RAM storing character pattern data in a storage area in units of pages. A CPU sets a given page address in a page address register in the font cartridge unit in the case of dot printing of characters other than standard characters. The CPU reads out desired character pattern data from the storage area of the ROM or RAM corresponding to the preset page address, and stores the readout data in a work memory. A printing mechanism controller controls a printing mechanism including a print head in accordance with the character pattern data stored in the work memory so as to execute dot printng of, e.g., high-density characters other than standard characters.

5 Claims, 5 Drawing Figures

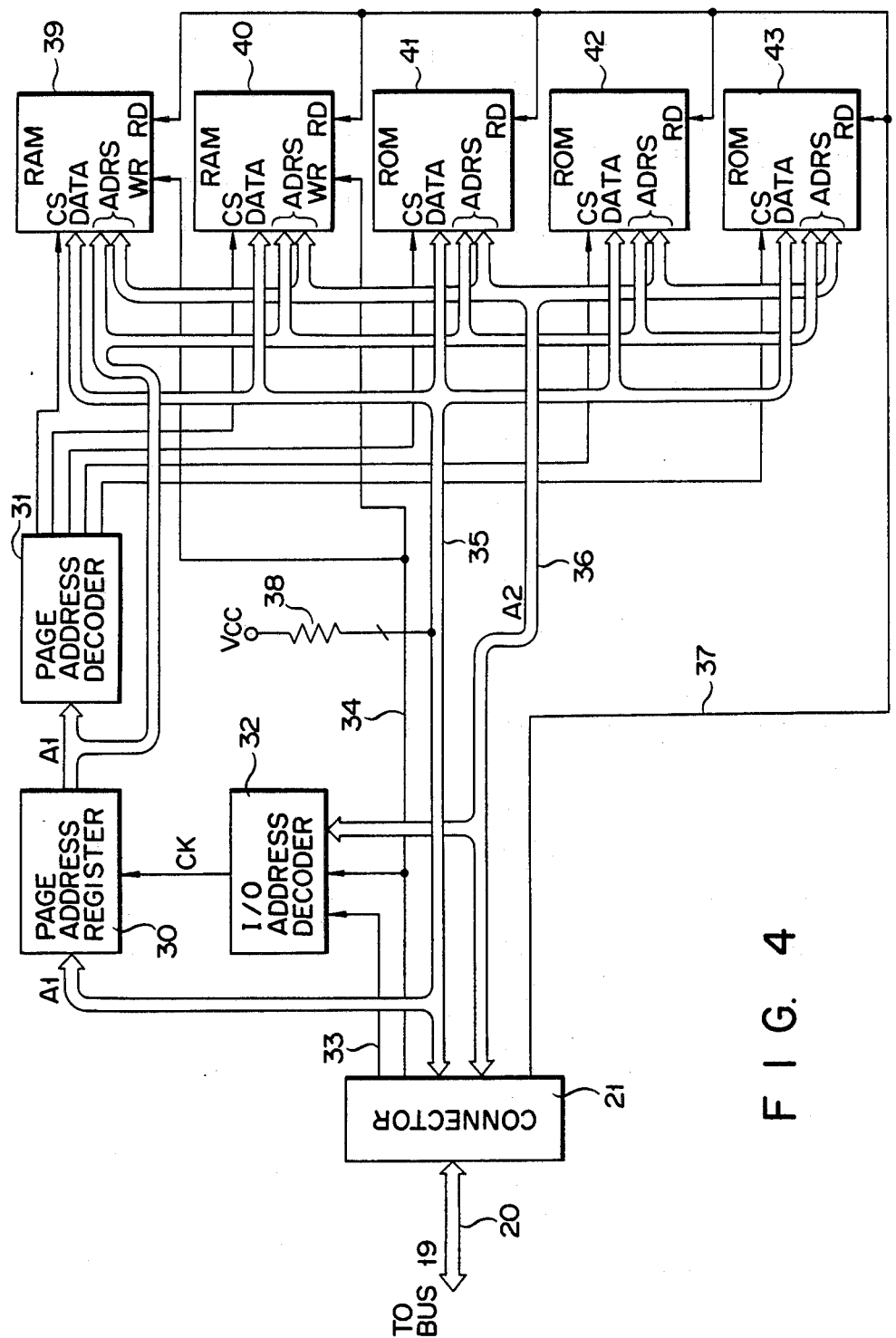
F I G. 4

DOT-MATRIX PRINTER WITH FONT CARTRIDGE UNIT

BACKGROUND OF THE INVENTION

The present invention relates to a dot-matrix printer with a font cartridge unit which reads out, e.g., high-density character pattern data stored in the font cartridge unit in advance and performs dot printing in accordance with the readout data.

Some dot-matrix printers can perform high-density dot printing corresponding to the printing quality of a fully formed character obtained by a fully formed character printer. Such a dot-matrix printer comprises a read-only memory (ROM) storing high-density character pattern data in addition to character pattern data corresponding to standard characters. The dot-matrix printer reads out desired character pattern data from this ROM, and performs high-density dot printing corresponding to the readout data.

Printing characters usually have different patterns varying, e.g., with countries. For this reason, if the dot-matrix printer comprises a ROM storing character pattern data for respective countries, a ROM requiring large capacity is needed, resulting in high total cost of the printer. In order to overcome such a drawback, ROMs respectively storing character pattern data corresponding to the respective countries are prepared in advance, and the corresponding ROM is selected as needed and is mounted on the dot-matrix printer. However, in this case, a storage capacity of the ROM mounted on the printer is fixed, and the number of types of fonts of characters to be printed is limited.

SUMMARY OF THE INVENTION

It is an object of the present invention to provide a dot-matrix printer with a font cartridge unit in which the font cartridge unit storing character pattern data corresponding to predetermined characters in addition to standard characters is prepared, a storage capacity of the font cartridge unit for the character pattern data can be changed, and characters of relatively many types of fonts can be dot-printed.

The object of the present invention can be achieved by a dot-matrix printer with a font cartridge unit having the following arrangement. According to the present invention, there is provided a dot-matrix printer comprising:

a font cartridge unit having a character pattern memory for storing character pattern data corresponding to predetermined characters in advance, an address register for storing address data used when the character pattern data is read out from the character pattern memory, and input/output means for inputting/outputting the address data stored in the address register and the character pattern data read out from the character pattern memory;

print control means for setting the address data in the address register so as to form print data in accordance with the character pattern data read out from the character pattern memory when the character pattern memory of the font cartridge unit is accessed;

connector means for connecting the input/output means of the font cartridge unit and the print control means so as to transfer the address data and the character pattern data therebetween; and print means for executing a dot-print operation in accordance with the print data formed by the print control means.

According to the dot-matrix printer with the above arrangement, a storage capacity of the font cartridge unit for the character pattern data can be changed. Therefore, character pattern data of relatively many types of font can be prepared as desired. Thus, characters of relatively many types of font can be dot-printed in addition to the standard characters.

BRIEF DESCRIPTION OF THE DRAWINGS

FIG. 4 is a block diagram showing an arrangement of the font cartridge unit of the present invention.

DETAILED DESCRIPTION OF THE PREFERRED EMBODIMENTS

Figure 1:
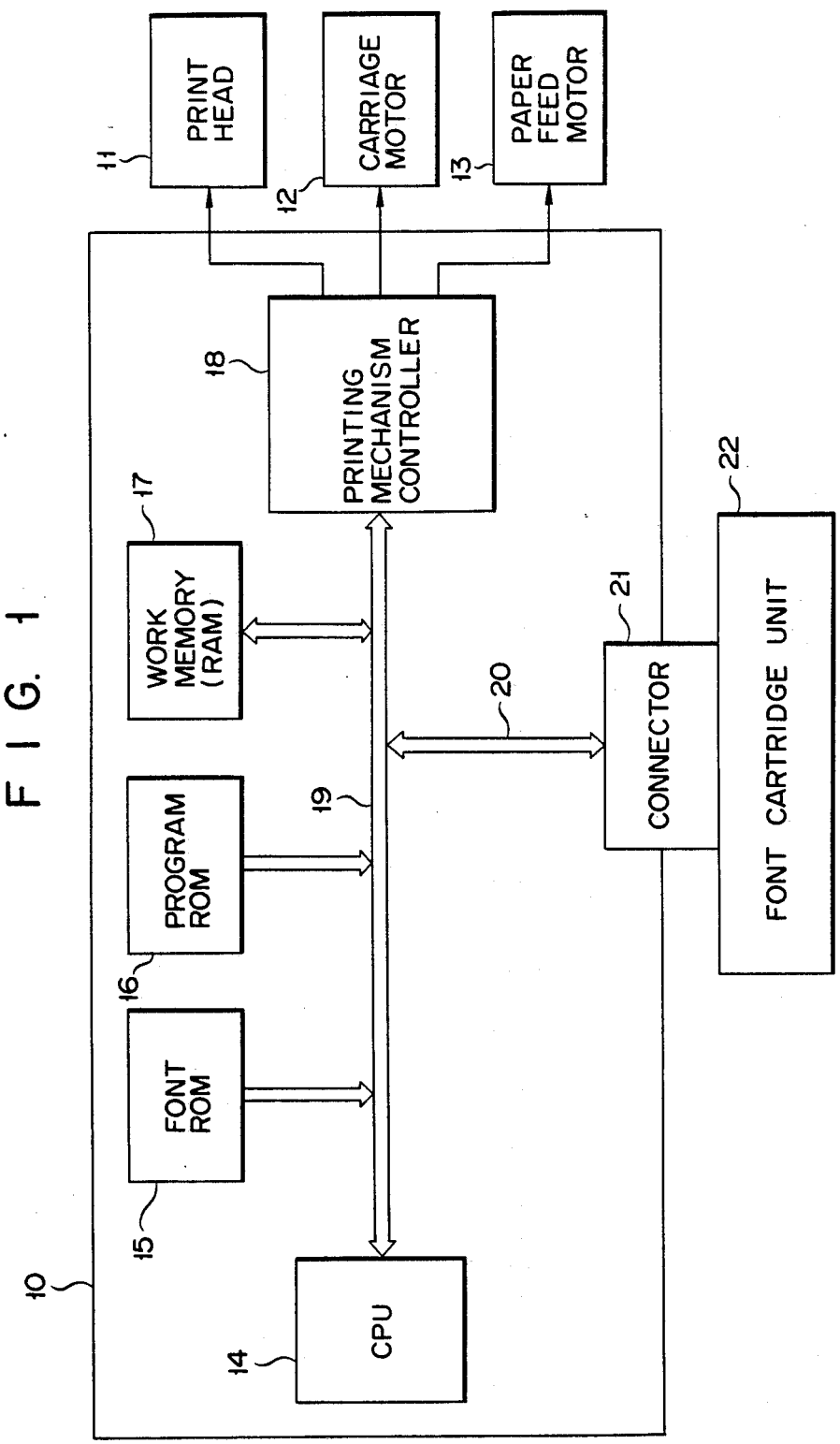
FIG. 1 is a block diagram showing an arrangement of a dot-matrix printer with a font cartridge unit according to the present invention.

An embodiment of the present invention will be described with reference to FIGS. 1 to 5. As shown in FIG. 1, a dot-matrix printer schematically comprises a printing control unit 10 and a printing mechanism. The printing mechanism comprises a print head 11, a carriage motor 12 for driving a carriage on which the head 11 is mounted, and a paper feed motor 13 for feeding paper.

The unit 10 comprises a microprocessor (CPU) 14, a font ROM 15, a program ROM 16, a read/write memory (RAM) 17, a printing mechanism controller 18 and a system bus 19. The CPU 14 is operated in accordance with a program stored in the program ROM 16 in advance so as to control the overall mechanism of the printer. The font ROM 15 stores character pattern data (font data) corresponding to standard characters. The RAM 17 is a work memory used when the CPU 14 forms print data. The controller 18 performs drive control of the print head 11, the carriage motor 12 and the paper feed motor 13 in accordance with the print data and control data supplied from the CPU 14.

A font cartridge unit 22 is connected to the unit 10 through a connector 21. The connector 21 is detachable from the unit 10, and is connected to the system bus 19 through a bus 20 when it is connected.

Figure 2:
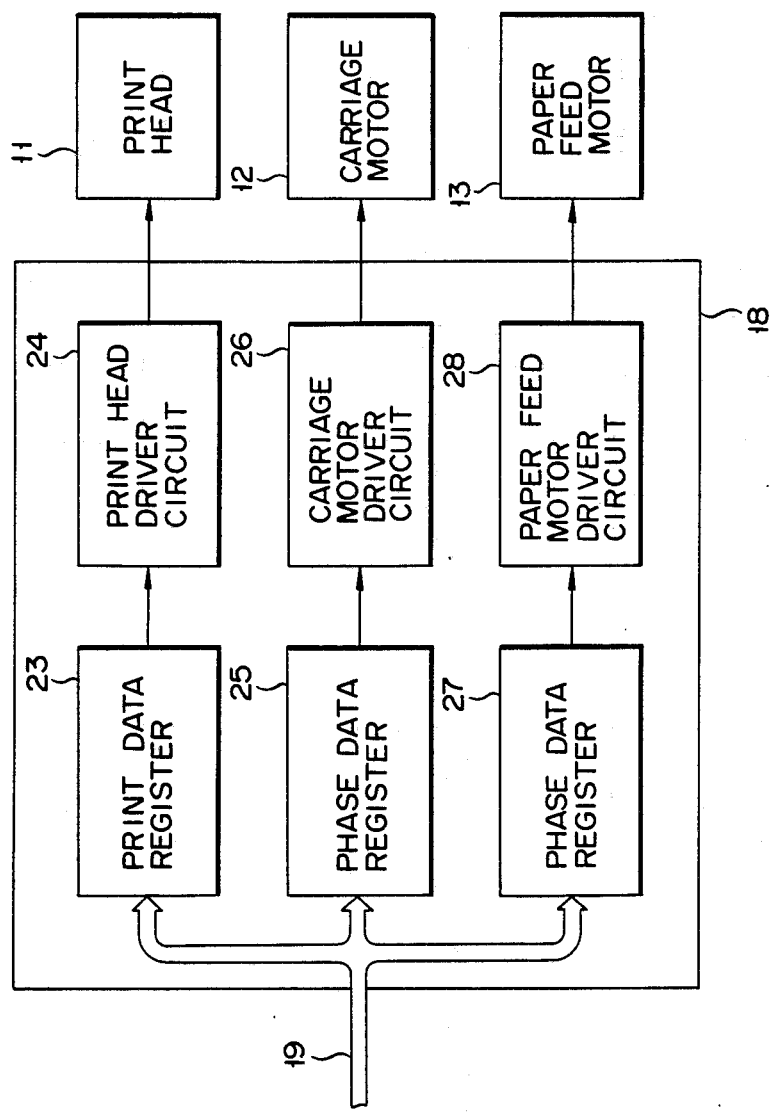
FIG. 2 is a block diagram showing an arrangement of a printing mechanism controller of the present invention.

As shown in FIG. 2, the controller 18 comprises a print data register 23 and a print head driver circuit 24 required for drive control of the print head 11. The register 23 stores the print data transferred from the RAM 17 through the system bus 19 under the control of the CPU 14. The circuit 24 selectively drives dot pins of the head 11 in accordance with the print data stored in the register 23. Note that the print data consists of character pattern data for one line.

Furthermore, the controller 18 comprises a phase data register 25 and a carriage motor driver circuit 26 required for drive control of the motor 12, and a phase data register 27 and a paper feed motor driver circuit 28 required for drive control of the paper feed motor 13. The registers 25 and 27 store the various phase data required for switching control of excitation phases of the motors 12 and 13 as stepping motors. The circuit 26 supplies an excitation current to excitation coils of the motor 12 so as to drive it. The circuit 28 supplies an excitation current to excitation coils of the motor 13 so as to drive it. The phase data is transmitted to the corresponding registers 25 and 27 through the system bus 19.

Figure 3:
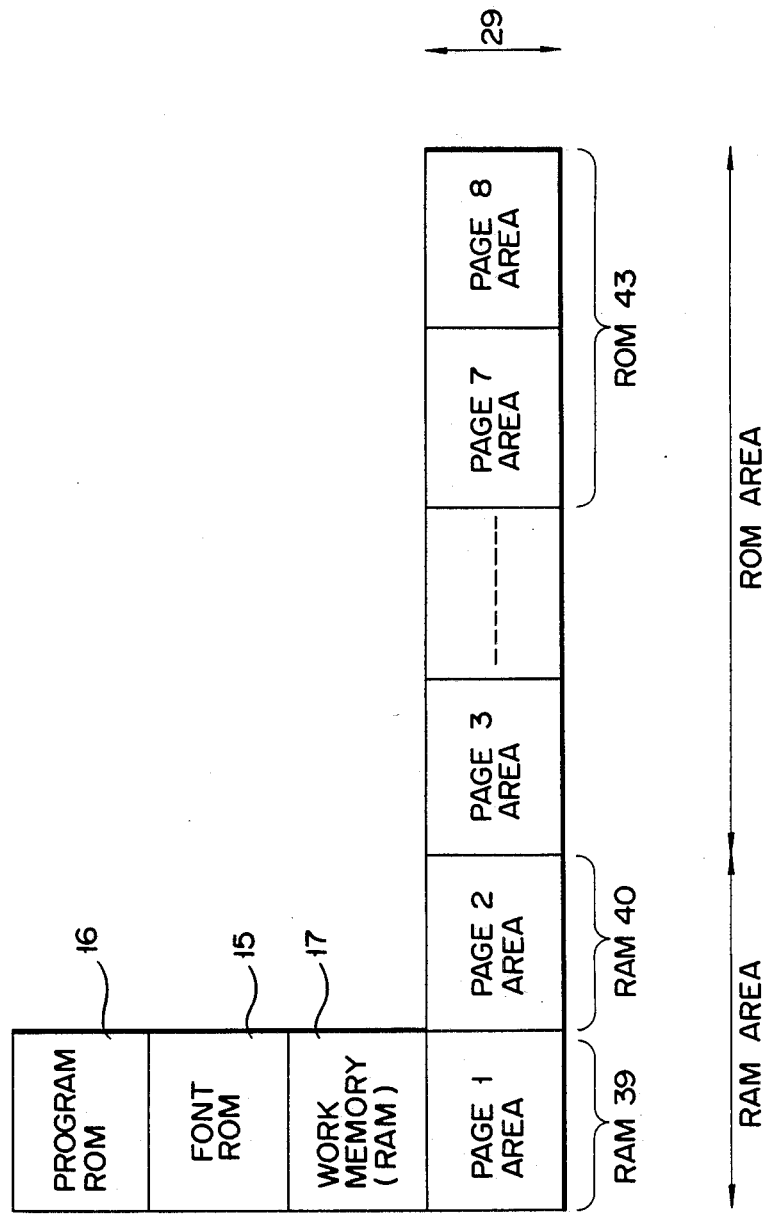
FIG. 3 is a memory map of the printer of the present invention.
Figure 5:
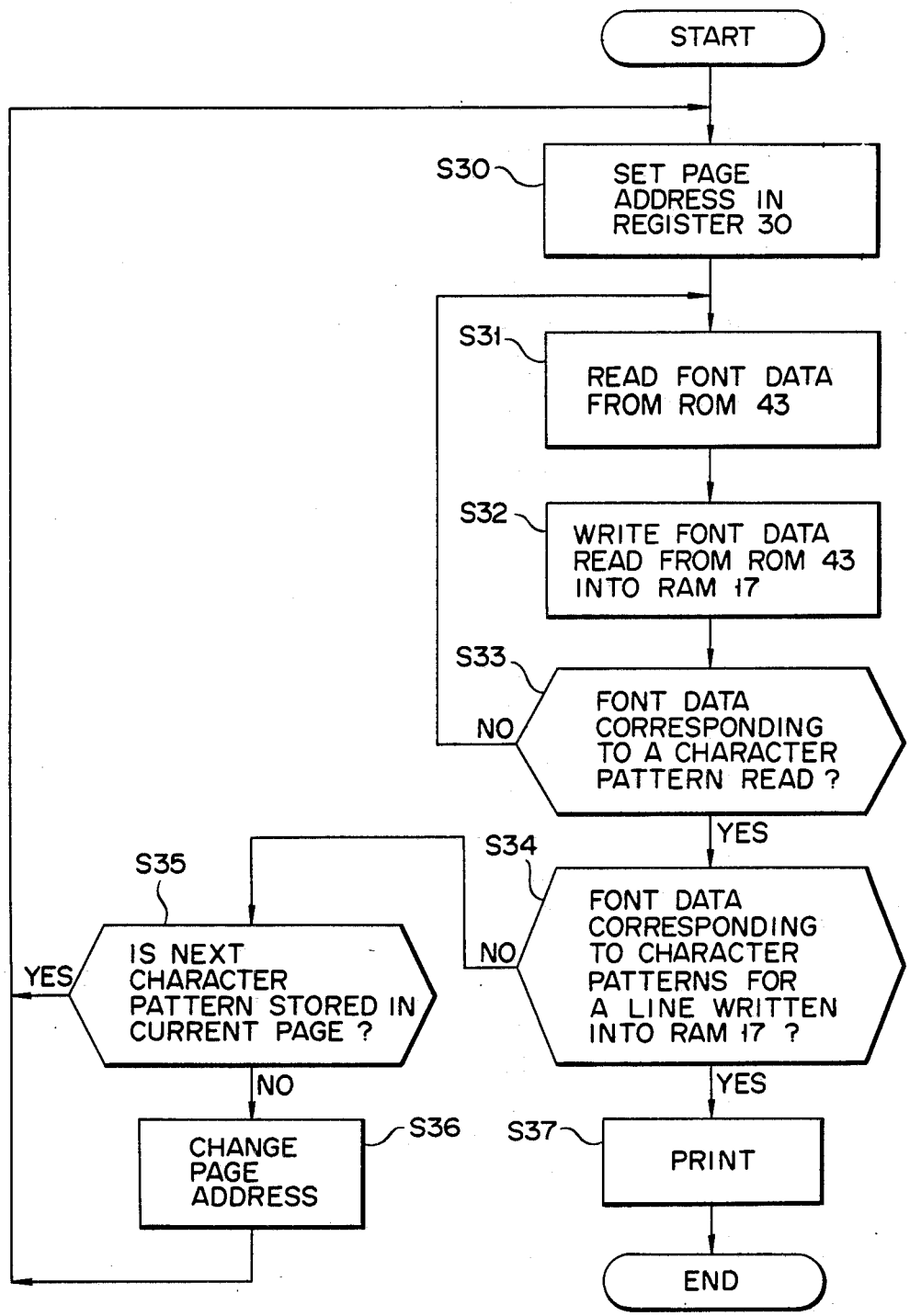
FIG. 5 is a flow chart for explaining the operation of the present invention.

FIG. 3 shows a memory map of the printer according to the present invention. A memory area of the CPU 14 which can be freely accessed is constituted by four areas, i.e., the program ROM 16, the font ROM 15, the RAM 17 and a page area 29. The page area 29 comprises eight areas, i.e., page 1 to 8 areas. This portion is built into the font cartridge. Each page area stores character pattern data of each different font. The CPU 14 designates a page so as to switch banks, thereby accessing one of the eight page areas. The page 1 and 2 areas constitute a RAM area for packaging a RAM, and the page 3 to 8 areas constitute a ROM area for packaging a ROM. The page 1 and 2 areas are used so that a central processing unit of a system in which the printer of the present invention is used transmits (down line loading) character pattern having a desired font to be printed. The RAM area may or may not be battery-backed up. As shown in FIG. 4, the font cartridge unit 22 comprises a memory group consisting of RAMs 39 and 40 and ROMs 41 to 43, a page address register 30, a page address decoder 31 and an I/O address decoder 32. The RAMs 39 and 40 have a capacity sufficient to store character pattern data of one type of font, and correspond to the page 1 and 2 areas, respectively. The ROMs 41 to 43 store character pattern data of two types of font, respectively, and correspond to the page 3 to 8 areas.

The register 30 stores a page address transferred from the CPU 14 through the connector 21 when the character pattern data designated by the ROM or RAM is read out. The decoder 32 decodes an I/O address (direct address) transferred from the CPU 14 through the connector 21 and supplies to the register 30 a clock pulse CK required for the storage operation of the register 30 in accordance with the decoding result. The decoder 31 decodes the page address generated from the register 30 and the I/O address from the CPU 14, and supplies a chip select signal CS to the ROM or the RAM in accordance with the decoding result.

The operation of the dot-matrix printer with the above arrangement will be described hereinafter. A print command or a print character code is supplied from a host computer as an external device through an interface circuit (not shown), and the CPU 14 initiates printing processing. The CPU 14 stores character pattern data corresponding to a print character code in the storage area of the RAM 17 so as to develop the character pattern data for one line. When the print character code is a code corresponding to standard characters, the CPU 14 reads out the character pattern data corresponding to the print character code from the font ROM 15, and stores it in the RAM 17. When the character pattern data for one line is stored in the RAM 17, the CPU 14 transfers the print data including the character pattern data from the RAM 17 to the printing mechanism controller 18. The controller 18 controls the head 11 in accordance with the character pattern data transferred to the register 23 shown in FIG. 2. The head 11 prints a character corresponding to the character pattern data on a paper sheet. In this case, the head 11 is mounted on the carriage driven by the motor 12. When the motor 12 is driven by the controller 18, the head 11 is moved along a line on the paper sheet. When the motor 13 is driven by the controller 18, the paper sheet is fed every line every time the head 11 performs dot-printing for one line.

When the print character code received from the host computer is a code corresponding to characters other than standard characters, e.g., high-density dot characters, the CPU 14 reads out the corresponding character pattern data from the cartridge unit 22. That is, the character pattern data corresponding to the high-density dot character is stored in the ROM 43 of the unit 22 in advance.

The CPU 14 switches memory access to the unit 22 side in accordance with the print character code received from the host computer. As shown in step S30 of FIG. 5, a given page address A1 corresponding to the print character code is set in the register 30 through the buses 19 and 20, the connector 21 and an I/O bus 35. In this case, the CPU 14 transfers a direct address A2 for designating the address in the corresponding page to the I/O address decoder 32 through an address bus 36. The decoder 32 decodes the direct address A2 from the CPU 14 in accordance with an I/O select signal received from the CPU 14 through a control signal line 33, and supplies the activating clock pulse CK to the register 30 in accordance With the decoding result. In synchronism with the clock pulse CK, the register 30 stores the page address A1 from the CPU 14, and thereafter supplies it to the decoder 31. ; The decoder 31 decodes the page address A1 from the register 30 and the direct address A2 from the CPU 14, and supplies the chip select signal CS to the ROM 43. Thus, as shown in FIG. 4, the ROM 43 having, e.g., the page 7 and 8 areas storing the high-density character pattern data corresponding to the print character code, is selected.

As shown in step S31, the CPU 14 accesses the ROM 43 using the page address A1 for designating, e.g., pages 7 and 8 and the direct address A2 for designating the address in the corresponding page so as to read out the character pattern data constituting the high-density character pattern data from the ROM 43. The CPU 14 supplies a read control signal RD to the ROM 43 through a memory read line 37 so as to read out the character pattern data through the I/O bus 35, the connector 21 and the buses 20 and 19.

As shown in step S32, the CPU 14 writes the character pattern data read out from the ROM 43 in the storage area of the RAM 17 designated by the direct address A2. The CPU 14 repeats the above-mentioned read operation of the character pattern data with respect to the ROM 43. This processing is repeated by discrimination processing in step S33 until the character pattern data for one character is read out from the ROM 43 and is stored in the RAM 17.

The CPU 14 repeats the read operation with respect to the ROM 43 in accordance with discrimination processing in step S34 until the character pattern data for one line is developed in the RAM 17. When the character pattern data for one line is developed in the RAM 17, the CPU 14 determines whether or not necessary character pattern data is stored in the storage area of the ROM 43 corresponding to the current page address (step S35). If this determination shows that the necessary character pattern data is not stored in the storage area corresponding to the current page address, the CPU 14 performes processing for switching the page addresses (step S36). That is, the CPU 14 switches the page address corresponding to, e.g., page 7 to that corresponding to, e.g., page 8, and sets it in the register 30 shown in FIG. 4. Thus, the CPU 14 reads out the character pattern data stored in the page 8 area of the ROM 43 and stores the readout data in the RAM 17.

In this manner, when a print character code corresponding to characters other than standard characters is transmitted from the host computer, the CPU 14 reads out, e.g., the preset high-density character pattern data corresponding to the print character code from the ROM 43 of the unit 22. When the high-density character pattern data for one line read out from the ROM 43 is developed in the RAM 17, the CPU 14 executes the printing operation shown in step S37. In other words, the CPU 14 transfers the print data including the character pattern data from the RAM 17 to the controller 18 in the same manner as in the dot-printing operation of standard characters. The controller 18 controls the head 11 in accordance with the high-density character pattern data transmitted to the register 23 shown in FIG. 2. Thus, the head 11 dot-prints a character corresponding to the high-density character pattern data on the paper sheet.

The present invention adopts an arrangement in which the font cartridge unit 22 comprising the ROM 43 storing character pattern data corresponding to, e.g., high-density characters (corresponding to fully formed characters) other than standard characters in advance is connected to the printing control unit 10 through the connector 21. For this reason, when font cartridge units 22 respectively storing character pattern data corresponding to characters of respective countries are prepared, and the desired unit 22 is selected and connected to the unit 10, dot printing corresponding to characters of a desired country can be performed. In this case, since the ROMs 41 to 43 or the RAMs 39 and 40 storing the character pattern data need not be fixed in the unit 10, the unit 10 requires no large-capacity memory for storing character pattern data other than the standard character pattern data.

Furthermore, the page address register 30 is provided in the unit 22, and the desired character pattern data is read out from, e.g., the ROM 43 in accordance with the page address set by the CPU 14. Therefore, the number of storage areas for storing character pattern data in units of pages (a storage capacity of a ROM or RAM) can be easily changed. Thus, since the storage capacity with respect to the character pattern data in the unit 22 can be changed, character pattern data corresponding to a relatively large number of types of fonts of characters can be read out for dot printing.

What is claimed is:

1. A dot-matrix printer with a font cartridge unit comprising:
    a font cartridge unit having a character pattern memory for storing character pattern data corresponding to a given type of characters in units of pages, an address register for storing page address data for designating a page address used when the character pattern data is read out from said character pattern memory, and input/output menas for inputting/outputting the page address data stored in said address register and the character pattern data read out from said character pattern memory;
    print control means, having a print memory accessed with a direct address corresponding to the page address, for setting the page address data in said page address register and for storing the character pattern data read out from said character pattern memory in said print memory so as to form print data when said character pattern memory of said font cartridge unit is accessed;
    connector means having a detachable mechanism for selectively connecting and disconnecting said input/output means of said font cartridge unit and said print control means, for enabling the transfer of the page address data and the character pattern data between said input/output means and said print control means when said connector means connects said input-output means to said print control means; and
    print means for executing a dot-print operation in accordance with the print data formed by said print control means.

2. A printer according to claim 1, wherein said character pattern memory of said font cartridge unit comprises a read-only memory and stores specific character pattern data.

3. A printer according to claim 1, wherein said font cartridge unit comprises a page address decoder, and said page address decoder decodes the page address in said page address register and an address in a page generated from said print control means and supplies a chip select signal to said character pattern memory in accordance with the decoding result.

4. A printer according to claim 1, wherein said print means comprises a print head and printing mechanism control means so that said printing mechanism control means controls said print head in accordance with the print data formed by said print control means.

5. A dot-matrix printer for printing either standard character patterns or supplemental character patterns in response to requests for printing the standard character patterns or the supplemental character patterns, the printer comprising:
    a print control unit including a standard character pattern memory for storing at associated memory addresses character patterns to be printed with a standard character font, a working memory for storing a line of characters to be printed, and a processing unit coupled to said standard character pattern memory and said working memory;
    a supplemental font cartridge unit including a supplemental character pattern memory for storing at associated memory addresses character patterns to be printed with a non-standard character font;
    print control means coupled to said working memory and said processing unit and having a print buffer for storing character patterns to be printed;
    connector means for removably connecting said supplemental font cartridge unit to said printing control unit and coupling the processing unit to the supplemental character pattern memory, such that the processing unit receives requests for printing, retrieves standard character patterns from said standard character pattern memory or supplemental character patterns from said supplemental character memory in response to the received requests, and stores said retrieved character patterns in said working memory; and
    print means for executing dot-print operations in accordance with the print data stored in said working memory.

* * * * *